(12) United States Patent
Reeves et al.

(10) Patent No.: US 12,214,388 B2
(45) Date of Patent: Feb. 4, 2025

(54) FLUID REGULATOR HAVING INTEGRAL FLUID PURGE MECHANISM

(71) Applicant: G. P. REEVES, INC., Holland, MI (US)

(72) Inventors: Kevin Reeves, Hamilton, MI (US); Ryan Schierbeek, Holland, MI (US); Kirk Brink, Holland, MI (US); Josh Hendrick, Wyoming, MI (US); Brad Alvesteffer, Zeeland, MI (US)

(73) Assignee: G. P. Reeves, Inc., Holland, MI (US)

( * ) Notice: Subject to any disclaimer, the term of this patent is extended or adjusted under 35 U.S.C. 154(b) by 47 days.

(21) Appl. No.: 18/119,892

(22) Filed: Mar. 10, 2023

(65) Prior Publication Data

US 2023/0302505 A1 Sep. 28, 2023

Related U.S. Application Data

(60) Provisional application No. 63/322,356, filed on Mar. 22, 2022.

(51) Int. Cl.
| | | |
|---|---|---|
| *B08B 9/032* | (2006.01) | |
| *F16K 15/06* | (2006.01) | |
| *F16K 29/00* | (2006.01) | |
| *G05D 16/20* | (2006.01) | |

(52) U.S. Cl.
CPC .......... *B08B 9/0325* (2013.01); *F16K 15/063* (2013.01); *F16K 29/00* (2013.01); *B08B 2209/032* (2013.01); *G05D 16/2086* (2013.01); *Y10T 137/7826* (2015.04)

(58) Field of Classification Search
CPC ................ G05D 16/2086; F16K 31/05; Y10T 137/7826
See application file for complete search history.

(56) References Cited

U.S. PATENT DOCUMENTS

| | | | | |
|---|---|---|---|---|
| 1,566,255 | A | * 12/1925 | Spreen | .................. F25B 41/335 137/505.42 |
| 1,832,863 | A | * 11/1931 | Hewitt | .................... B60T 17/18 303/67 |
| 2,597,479 | A | * 5/1952 | Hammon | ........... G05D 16/0663 267/123 |
| 2,896,660 | A | 7/1959 | Lofink | |
| 3,310,065 | A | 3/1967 | Godshalk | |
| 3,387,622 | A | 6/1968 | Weinstein | |
| 3,411,523 | A | 11/1968 | Lapera | |
| 3,451,421 | A | 6/1969 | Vicenzi et al. | |

(Continued)

*Primary Examiner* — Robert K Arundale
(74) *Attorney, Agent, or Firm* — Price Heneveld LLP

(57) ABSTRACT

A fluid regulator includes a poppet valve within a flow path that selectively allows a flow of fluid to move from an inlet to an outlet. A threaded regulating interface adjusts a spring tension exerted toward the poppet valve and defines a regulated flow of the fluid through the flow path. A fluid purge mechanism is positioned within the threaded regulating interface. The fluid purge mechanism operates along a rotational axis of the threaded regulating interface and adjusts a boundary of the flow path and manipulates the poppet valve to a maximum operating position to define a purging flow of the fluid. A programmable logic controller cooperates with the powered actuator and a pressure sensor to define a closed-loop interface that adjusts the regulated flow of the fluid through the flow path.

20 Claims, 14 Drawing Sheets

(56) References Cited

U.S. PATENT DOCUMENTS

| | | | |
|---|---|---|---|
| 3,586,027 | A | 6/1971 | Fitzgerald et al. |
| 4,257,450 | A | 3/1981 | Ollivier |
| 4,266,538 | A | 5/1981 | Ruchti |
| 4,275,764 | A | 6/1981 | Baret |
| 4,596,264 | A * | 6/1986 | Gladstone .......... G05D 16/2086 137/116.5 |
| 4,768,548 | A * | 9/1988 | Maurer .............. G05D 16/2086 137/487.5 |
| 4,773,443 | A * | 9/1988 | Maurer .............. G05D 16/2086 137/487.5 |
| 4,791,954 | A * | 12/1988 | Hasegawa ........... G05D 16/202 137/489.5 |
| 5,022,432 | A | 6/1991 | Engelbach |
| 5,452,741 | A | 9/1995 | Tomita et al. |
| 5,556,582 | A | 9/1996 | Kazmer |
| 5,657,787 | A * | 8/1997 | Diehl .................. G05D 16/107 137/116.5 |
| 5,660,502 | A | 8/1997 | Ferguson |
| 5,755,224 | A | 5/1998 | Good et al. |
| 6,283,145 | B1 * | 9/2001 | Fenn .................... G05D 16/163 137/489 |
| 6,354,341 | B1 | 3/2002 | Saveliev et al. |
| 6,361,300 | B1 | 3/2002 | Kazmer et al. |
| 6,443,335 | B1 | 9/2002 | Pinedjian et al. |
| 6,464,909 | B1 | 10/2002 | Kazmer et al. |
| 6,539,970 | B1 | 4/2003 | Knowles et al. |
| 6,589,039 | B1 | 7/2003 | Doughty et al. |
| 6,632,079 | B1 | 10/2003 | Kazmer et al. |
| 6,695,168 | B2 | 2/2004 | Pinedjian et al. |
| 6,824,379 | B2 | 11/2004 | Doyle et al. |
| 7,025,329 | B2 | 4/2006 | Winter |
| 7,383,851 | B2 | 6/2008 | Jacobsen et al. |
| 7,517,385 | B2 | 4/2009 | Winter |
| 7,815,079 | B2 | 10/2010 | Saveliev et al. |
| 8,402,995 | B2 | 3/2013 | Zoller |
| 8,408,516 | B2 | 4/2013 | Dlugoss |
| 11,118,691 | B2 | 9/2021 | Schierbeek et al. |
| 2003/0066562 | A1 | 4/2003 | Wakeman |
| 2004/0047935 | A1 | 3/2004 | Moss et al. |
| 2004/0232173 | A1 | 11/2004 | Saveliev et al. |
| 2008/0148725 | A1 | 6/2008 | Jacobsen et al. |
| 2017/0151992 | A1 | 6/2017 | Ramraika et al. |

* cited by examiner

FLUID REGULATOR HAVING INTEGRAL FLUID PURGE MECHANISM

CROSS-REFERENCE TO RELATED APPLICATION

This application claims priority to and the benefit under 35 U.S.C. § 119(e) of U.S. Provisional Patent Application No. 63/322,356, filed on Mar. 22, 2022, entitled FLUID REGULATOR HAVING INTEGRAL FLUID PURGE MECHANISM, the entire disclosure of which is hereby incorporated herein by reference.

FIELD OF THE INVENTION

The present invention generally relates to fluid regulators, and more specifically, a fluid regulator having a fluid purge mechanism that is integrally positioned within a regulating interface for the fluid regulator.

BACKGROUND OF THE INVENTION

Fluid regulators are included within fluid flow systems for regulating and adjusting flow of fluid through a particular system. Fluid regulators can include a mechanism that can be utilized for increasing or decreasing the amount of fluid that can flow through the particular fluid regulator. Certain mechanisms include a purge mechanism that allows for fluid to be flushed at a higher rate through the fluid regulator.

SUMMARY OF THE INVENTION

According to one aspect of the present invention, a fluid regulator includes a poppet valve that is disposed within a flow path and selectively allows a flow of fluid from an inlet to an outlet. A threaded regulating interface adjusts a spring tension that is exerted toward the poppet valve and defines a regulated flow of the fluid through the flow path. The threaded regulating interface is operated by a powered actuator about a rotational axis. A fluid purge mechanism is positioned within the threaded regulating interface. The fluid purge mechanism operates along the rotational axis and adjusts a boundary of the flow path and manipulates the poppet valve to a maximum operating position to define a purging flow of the fluid from the inlet to the outlet. A pressure sensor is in communication with the flow path. A programmable logic controller cooperates with the powered actuator and the pressure sensor to define a closed-loop interface that adjusts the regulated flow of the fluid through the flow path.

According to another aspect of the present disclosure, a fluid regulator includes a housing that defines an internal flow path and an internal regulating path that intersects the internal flow path. A poppet valve is disposed within the internal regulating path and the internal flow path. The poppet valve in a standard state defines a selectively regulated flow of fluid through the internal flow path. A poppet biasing force biases the poppet valve to a closed position. A regulating interface is positioned within the internal regulating path. The regulating interface includes a powered actuator that operates the regulating interface to overcome the poppet biasing force to define the selectively regulated flow of the fluid. An automatic fluid purge mechanism is positioned within the regulating interface. The automatic fluid purge mechanism manipulates the poppet valve to define a maximum operating position that defines a purging flow of the fluid through the internal flow path. A pressure sensor is in communication with the flow path. A programmable logic controller cooperates with the powered actuator, the pressure sensor and the automatic fluid purge mechanism to define a closed-loop interface that adjusts the selectively regulated flow of the fluid through the flow path.

According to another aspect of the present disclosure, a method for operating a flow regulator includes the steps of delivering a fluid through a flow path of a fluid regulator, monitoring a sensed fluid pressure of the fluid within the flow path using a pressure sensor, comparing the sensed fluid pressure to a desired fluid pressure range, communicating an activated signal to a powered actuator of a regulating interface when the sensed fluid pressure is outside of the desire fluid pressure range, operating the regulating interface via the powered actuator, monitoring the sensed fluid pressure during operation of the regulating interface, and deactivating the powered actuator when the sensed fluid pressure is within the desired fluid pressure range.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
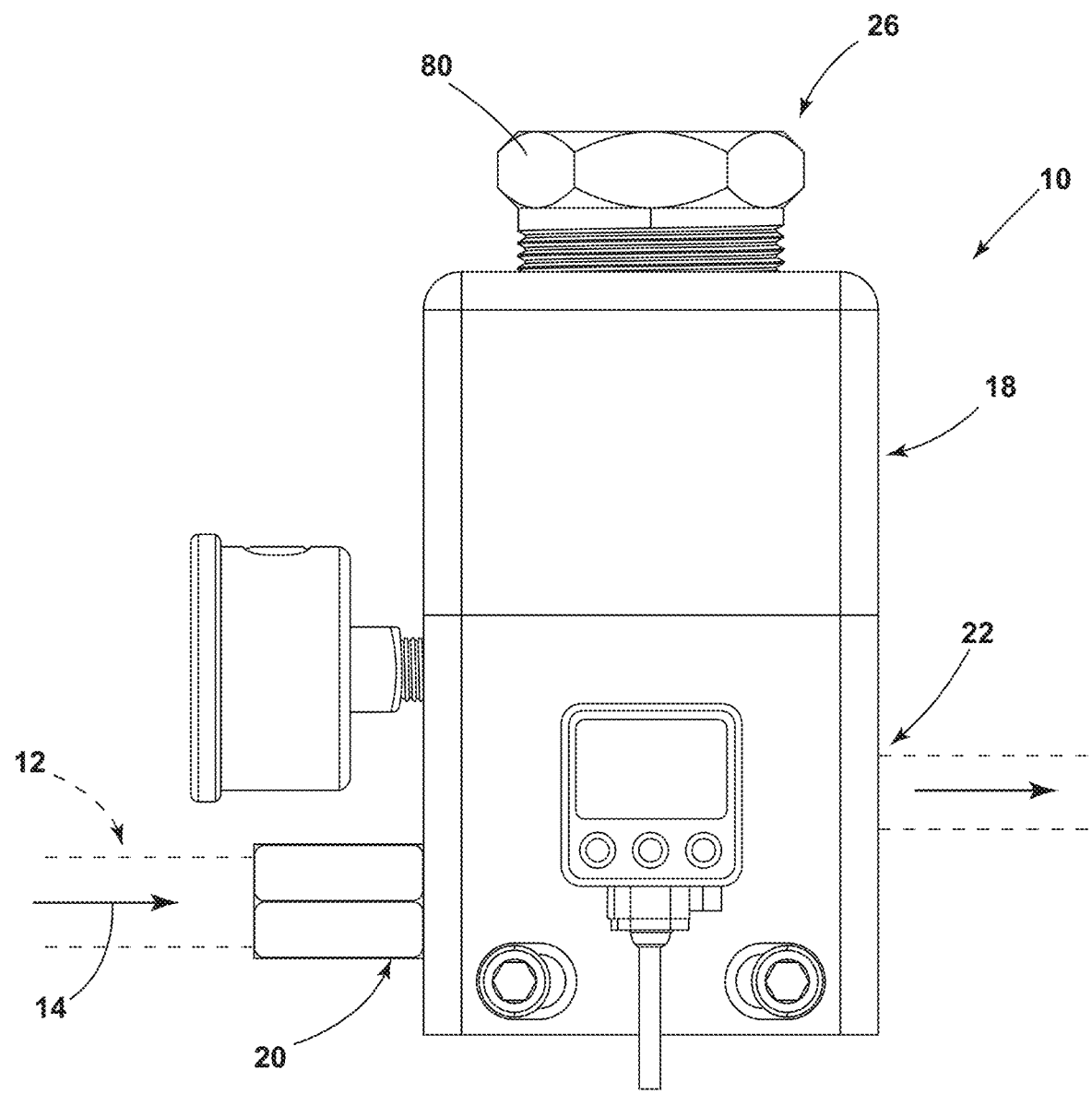
FIG. 1 is a front elevational view of a fluid regulator incorporating a pressure gauge, an electrical controller and an input valve.
Figure 2:
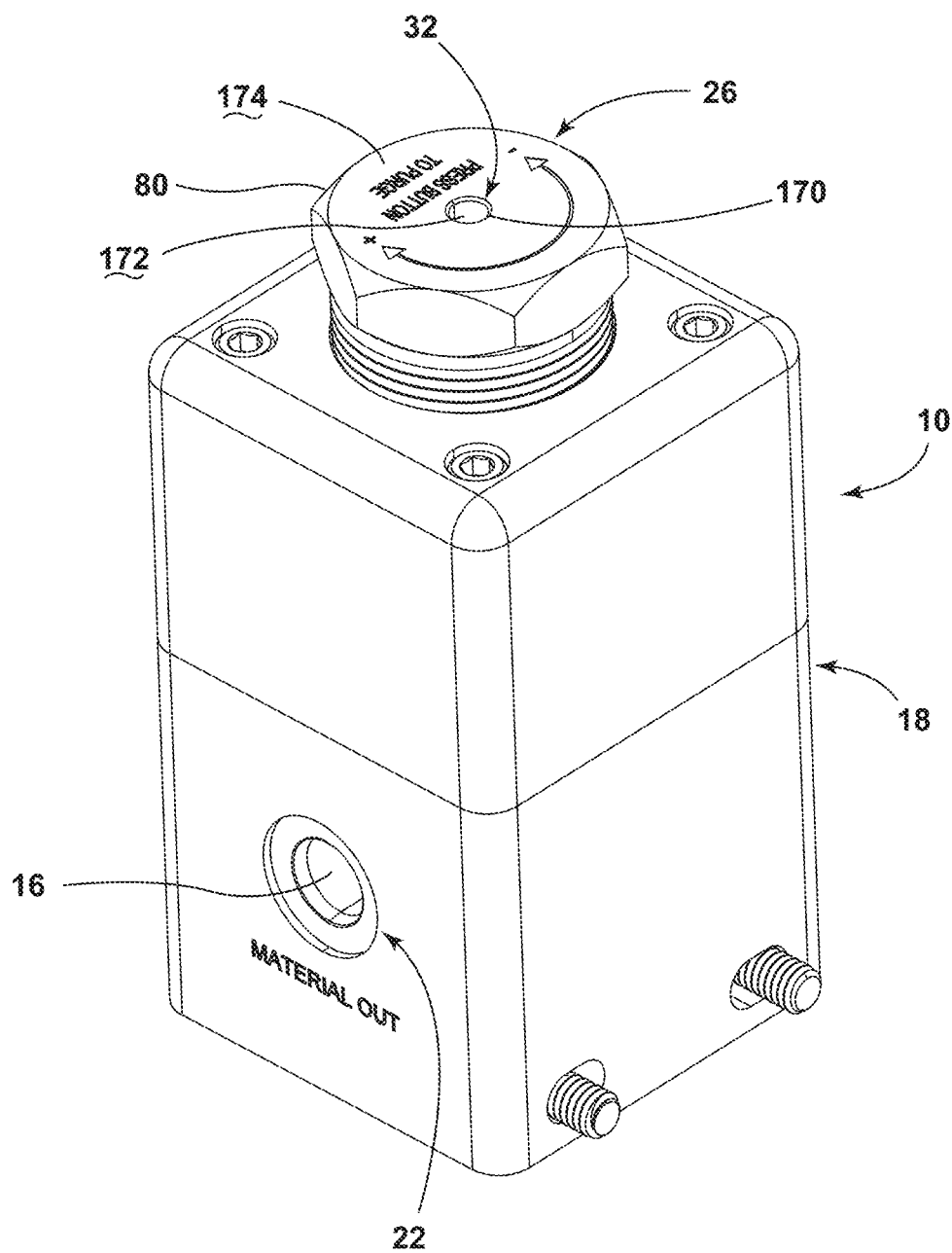
FIG. 2 is a side perspective view of an aspect of the fluid regulator.
Figure 3:
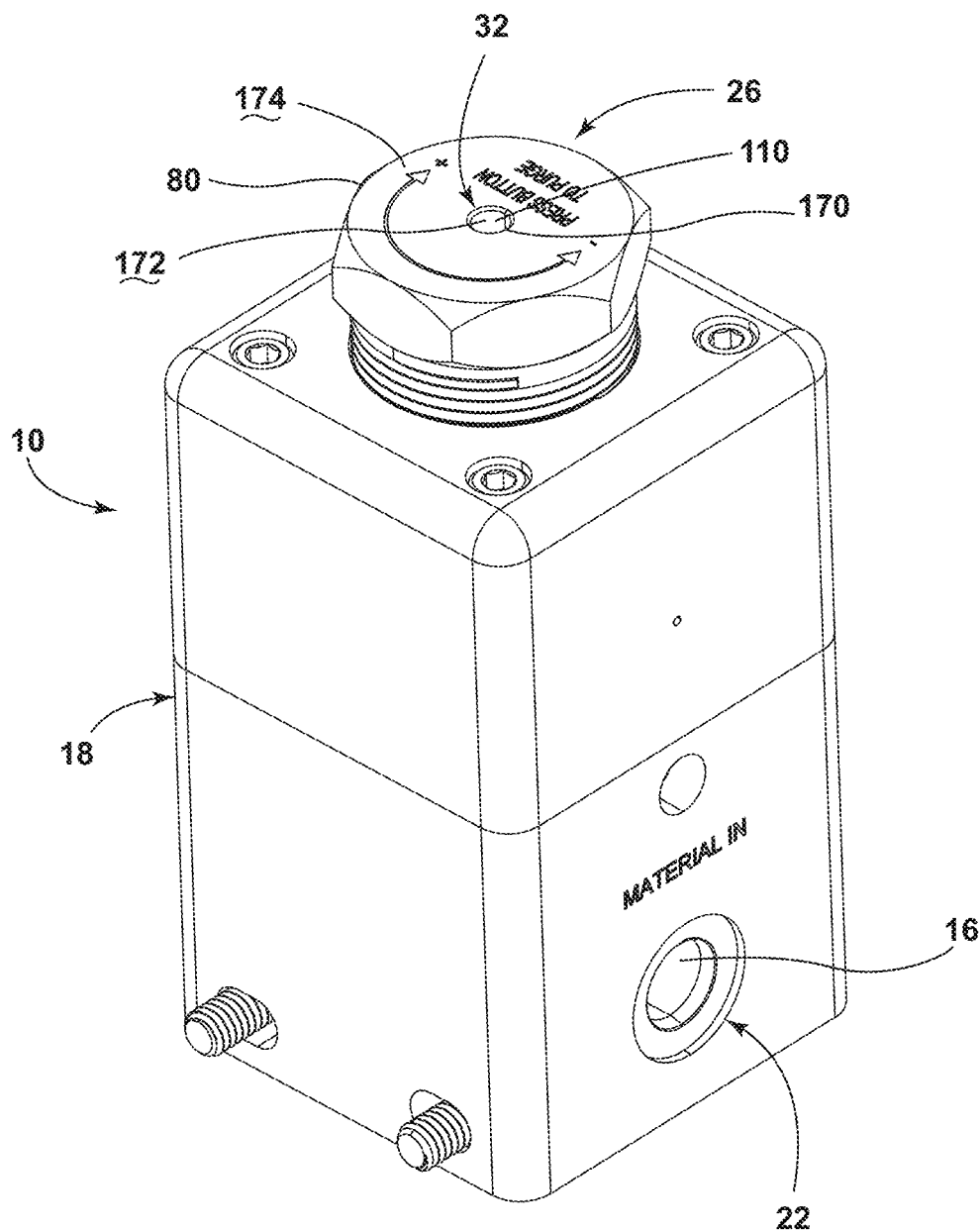
FIG. 3 is a side perspective view of the fluid regulator of FIG. 2.
Figure 4:
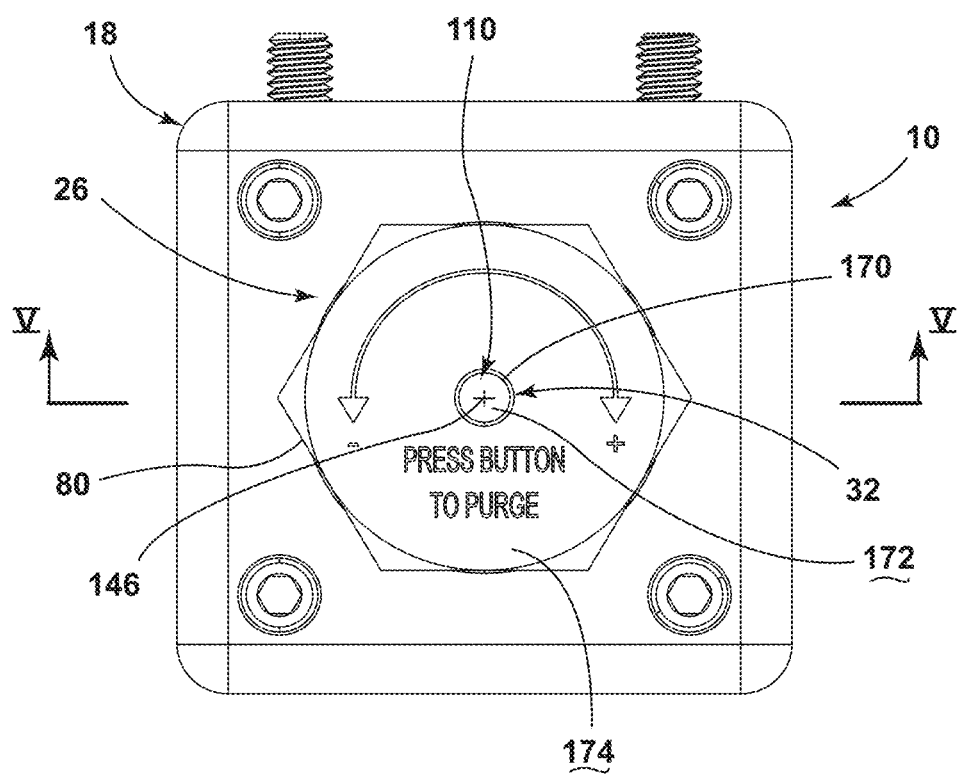
FIG. 4 is a top plan view of the fluid regulator of FIG. 2.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-10, reference numeral 10 generally refers to a fluid regulator that can be used within a fluid flow system 12 for regulating and adjusting an amount of fluid 14 that can pass through a particular flow path 16. The fluid regulator 10 can be incorporated within various mechanisms that can include, but are not limited to, dispensers, reservoirs, dispensing tools, fluid flow systems 12, and other similar assemblies. According to various aspects of the device, the fluid regulator 10 includes a housing 18 that includes a flow path 16 extending from an inlet 20 to an outlet 22. A poppet valve 24 is disposed within the flow path 16 and selectively allows of a flow of fluid 14 from the inlet 20 to the outlet 22. A regulating interface 26 is included that adjusts a spring tension 28 that is exerted toward the poppet valve 24. The regulating interface 26 defines a boundary 34 of the flow path 16. The spring tension 28 defines a regulated flow 30 of fluid 14 through the flow path 16 from the inlet 20 and to the outlet 22. A fluid purge mechanism 32 is positioned within the regulating interface 26. The fluid purge mechanism 32 adjusts the boundary 34 of the flow path 16 toward the poppet valve 24 and manipulates the poppet valve 24 to a purging open position 36 to define a purging flow 38 of the fluid 14 from the inlet 20 to the outlet 22.

Fluid 14 is caused to move through the fluid regulator 10 via operation of a pump (not shown) that causes a pressure of fluid 14 within the fluid regulator 10. As the pump operates, the pressure of the fluid 14 moving through the fluid regulator 10 increases. This increase in pressure causes the fluid 14 to bias the poppet valve 24, in cooperation with a poppet spring 50, toward a poppet seat 52. In this manner, a poppet surface 54 of the poppet valve 24 is biased against the poppet seat 52 to define a closed position 56 of the poppet valve 24. The poppet surface 54 is a generally conical surface and as the pressure of the fluid 14 behind the poppet surface 54 increases, this pressure can cause an increased poppet biasing force 58 in the direction of the closed position 56 of the poppet valve 24. Operation of the regulating interface 26 biases the poppet surface 54 away from the poppet seat 52 and overcomes the poppet biasing force 58 of the poppet spring 50 including any biasing force generated by the pressure of the fluid 14. By separating the poppet surface 54 from the poppet seat 52 to form a space 100, a selectively regulated flow 30 of fluid 14 through the poppet valve 24 is created.

As exemplified in FIGS. 2-6, the regulating interface 26 includes a biasing spring 70 that defines a spring tension 28 that biases an operable seal 74 toward the poppet valve 24. The poppet biasing force 58 opposes the spring tension 28. In this configuration, operation of the regulating interface 26 causes the predetermined spring tension 28 to overcome the poppet biasing force 58 and separate the poppet surface 54 from the poppet seat 52. A minimal operation of the regulating interface 26 will typically generate a minimal separation, or space 100, between the poppet surface 54 and the poppet seat 52, thereby causing a small magnitude of the regulated flow 30 of the fluid 14. Conversely, greater operation of the regulating interface 26 toward the poppet valve 24 can increase the separation, or space 100, between the poppet surface 54 and the poppet seat 52. This greater separation results in a higher magnitude of the regulated flow 30 of the fluid 14.

Referring again to FIGS. 2-6, the regulating interface 26 includes a threaded bolt 80 that is rotationally operable within the housing 18 to define a plurality of axial positions 82 of the threaded bolt 80 for the regulating interface 26. The plurality of axial positions 82 corresponds to a respective plurality of spring tensions 28. The plurality of spring tensions 28 includes any one of the predetermined spring tensions 28 that may be set through operation of the threaded bolt 80 for the regulating interface 26. By way of example, and not limitation, operation of the threaded bolt 80 toward the poppet valve 24 serves to increase the spring tension 28 that is exerted in the direction of the poppet valve 24, and, in turn, varying and corresponding sizes of the space 100 between the poppet surface 54 and the poppet seat 52. By increasing the spring tension 28 exerted toward the poppet valve 24, the spring tension 28 of the biasing spring 70 moves the poppet surface 54 farther from the poppet seat 52 to define a larger space 100. Conversely, where the threaded bolt 80 is operated away from the poppet valve 24, the space 100 becomes smaller and the magnitude of the regulated flow 30 of the fluid 14 is decreased.

Figure 5:
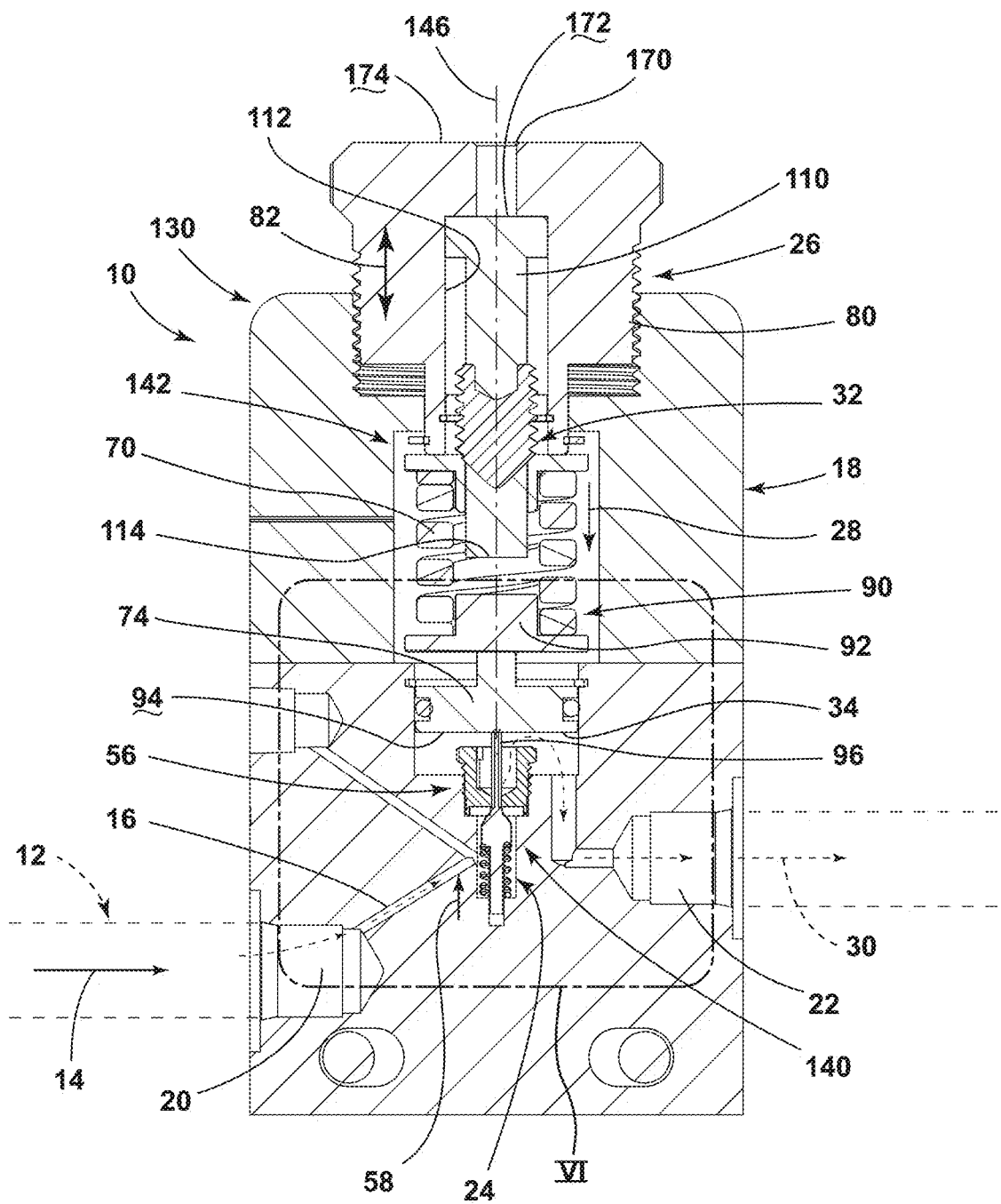
FIG. 5 is a cross-sectional view of the fluid regulator of FIG. 4 taken along line V-V.
Figure 6:
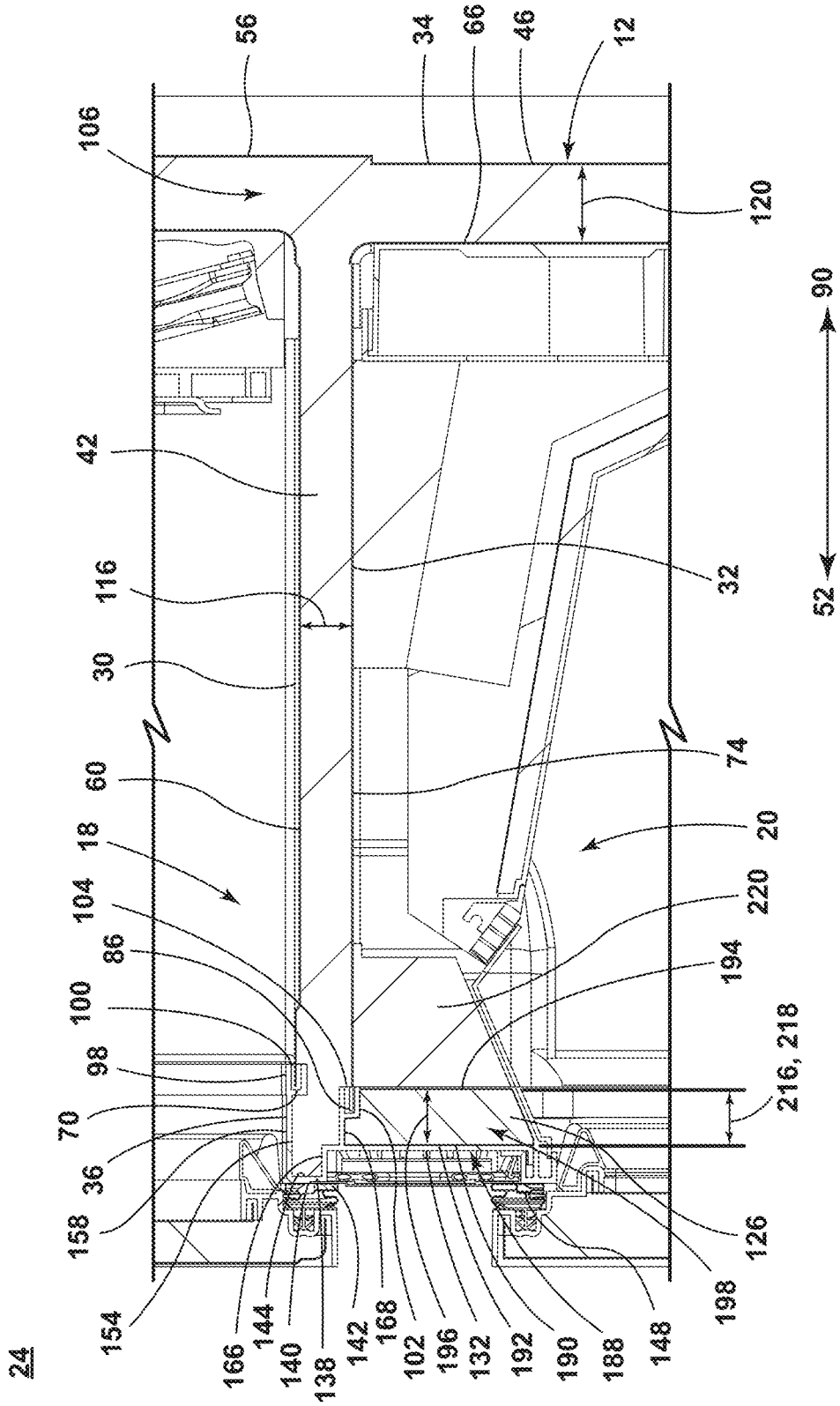
FIG. 6 is an enlarged cross-sectional view of the fluid regulator of FIG. 5 taken at area VI.
Figure 7:
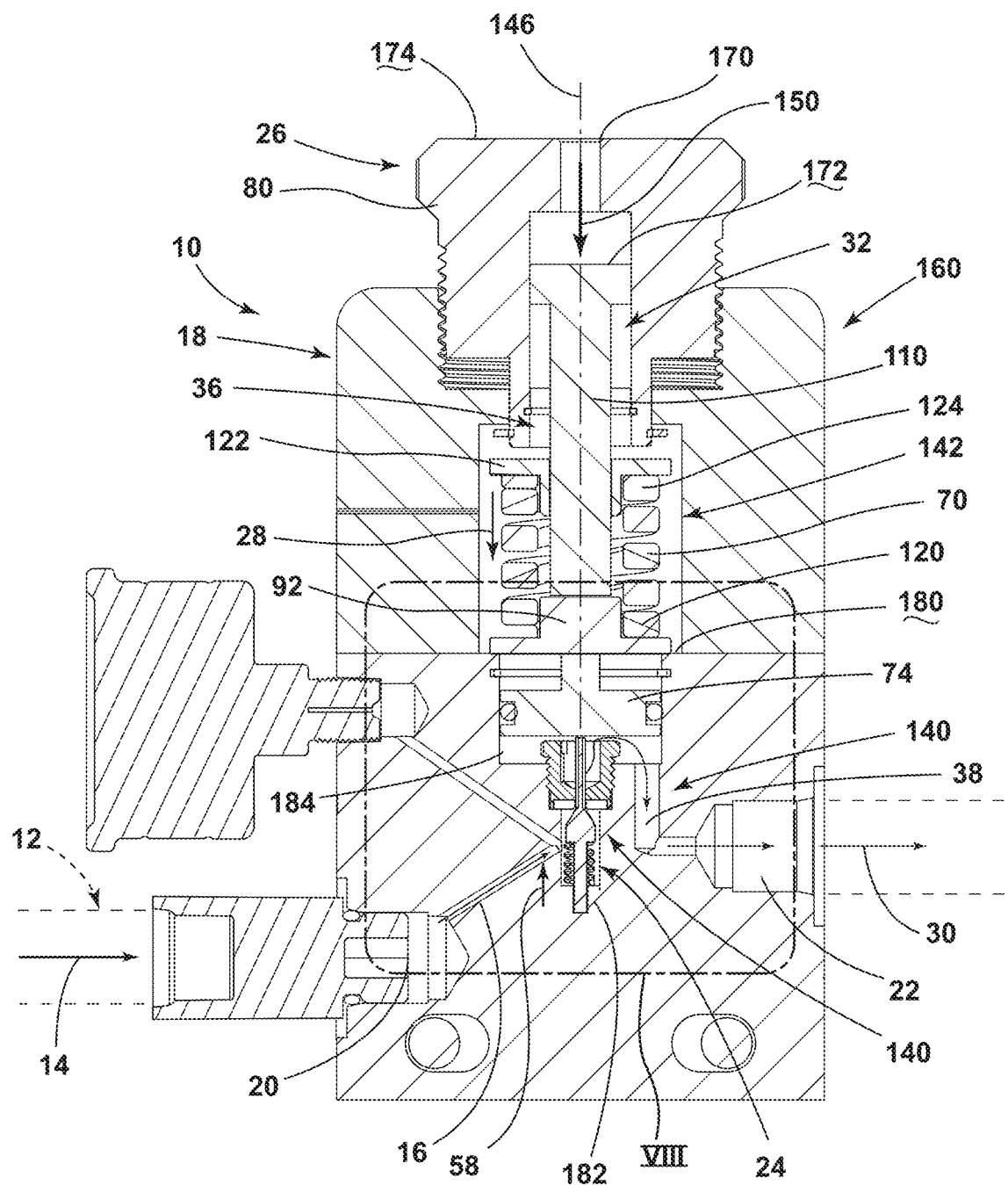
FIG. 7 is a cross-sectional view of the fluid regulator of FIG. 5 and showing an aspect of the purge mechanism in a purging state.
Figure 8:
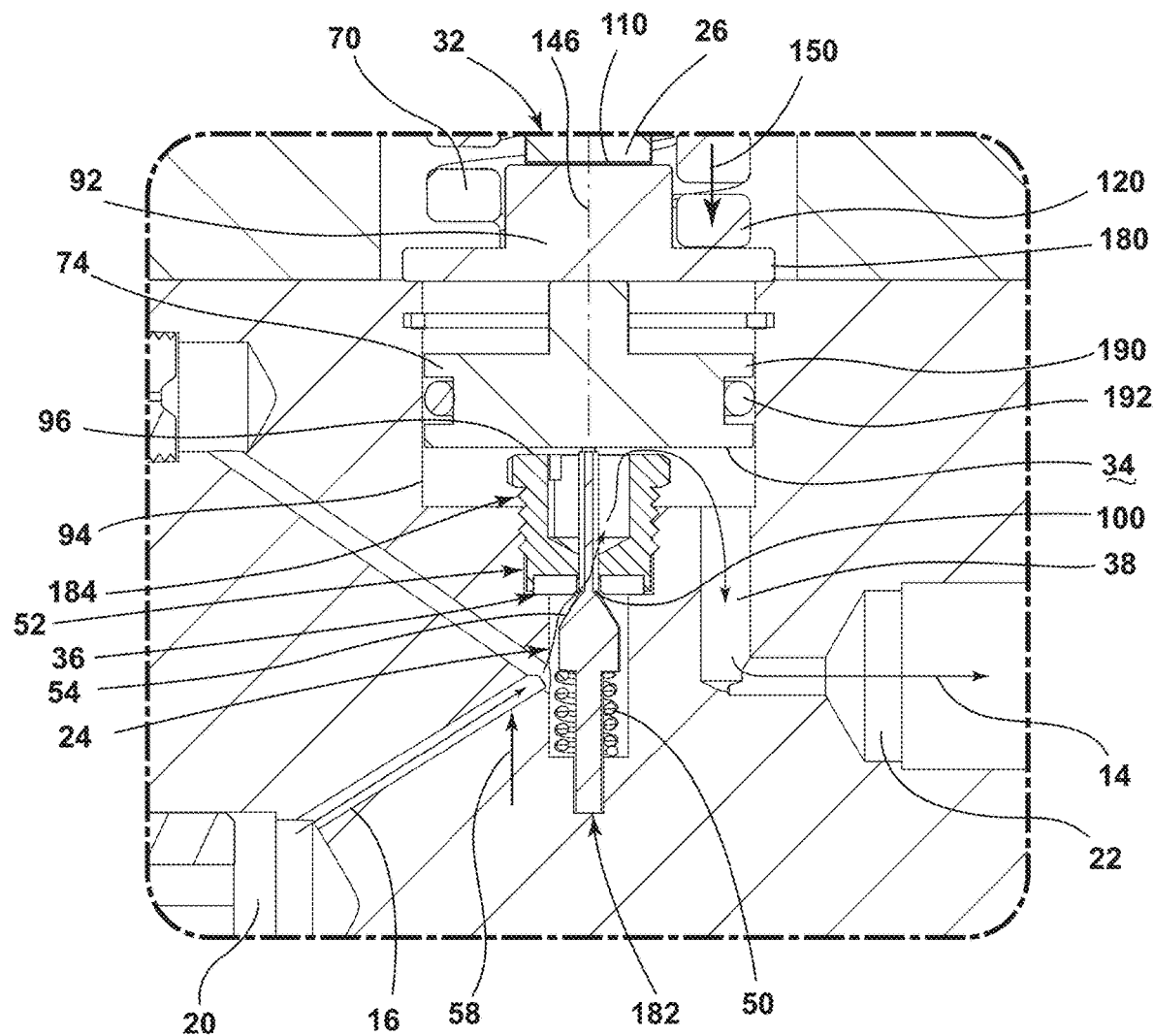
FIG. 8 is an enlarged cross-sectional view of the fluid regulator of FIG. 7 taken at area VIII.
Figure 9:
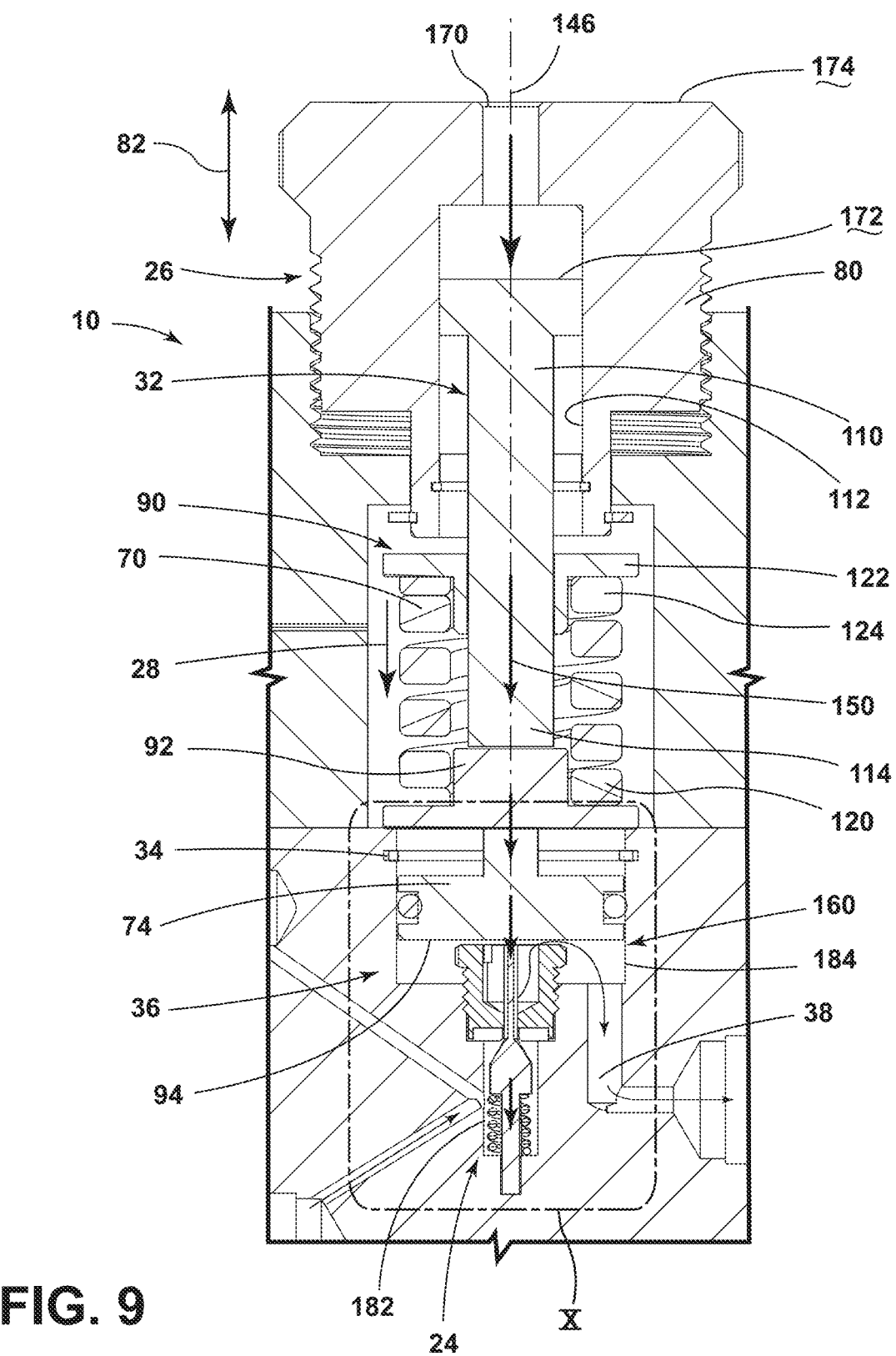
FIG. 9 is an enlarged cross-sectional view of the fluid regulator of FIG. 7 and showing operation of the purge mechanism toward the continuously open position.
Figure 10:
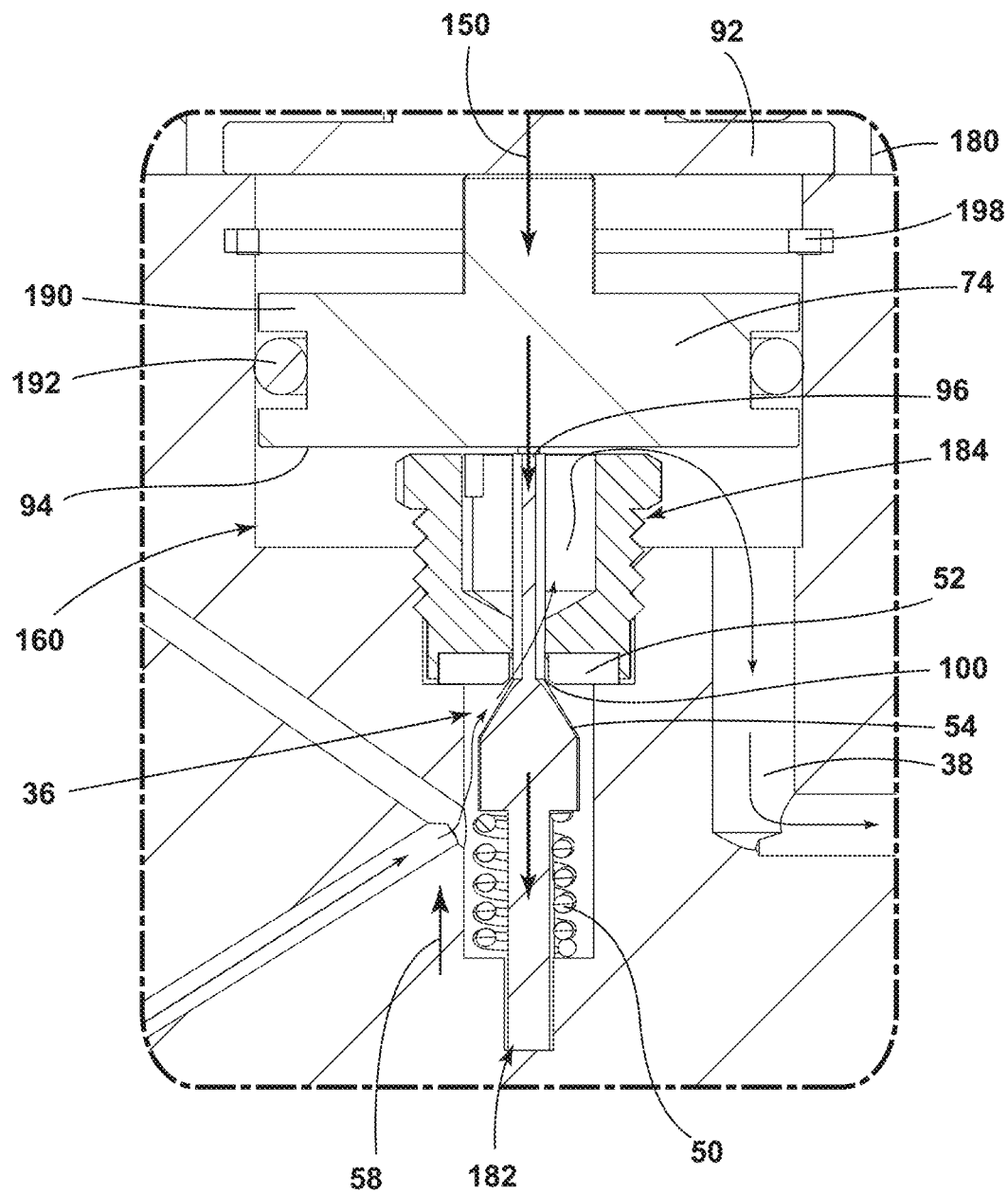
FIG. 10 is an enlarged cross-sectional view of the flow regulator of FIG. 9 taken at area X.
Figure 11:
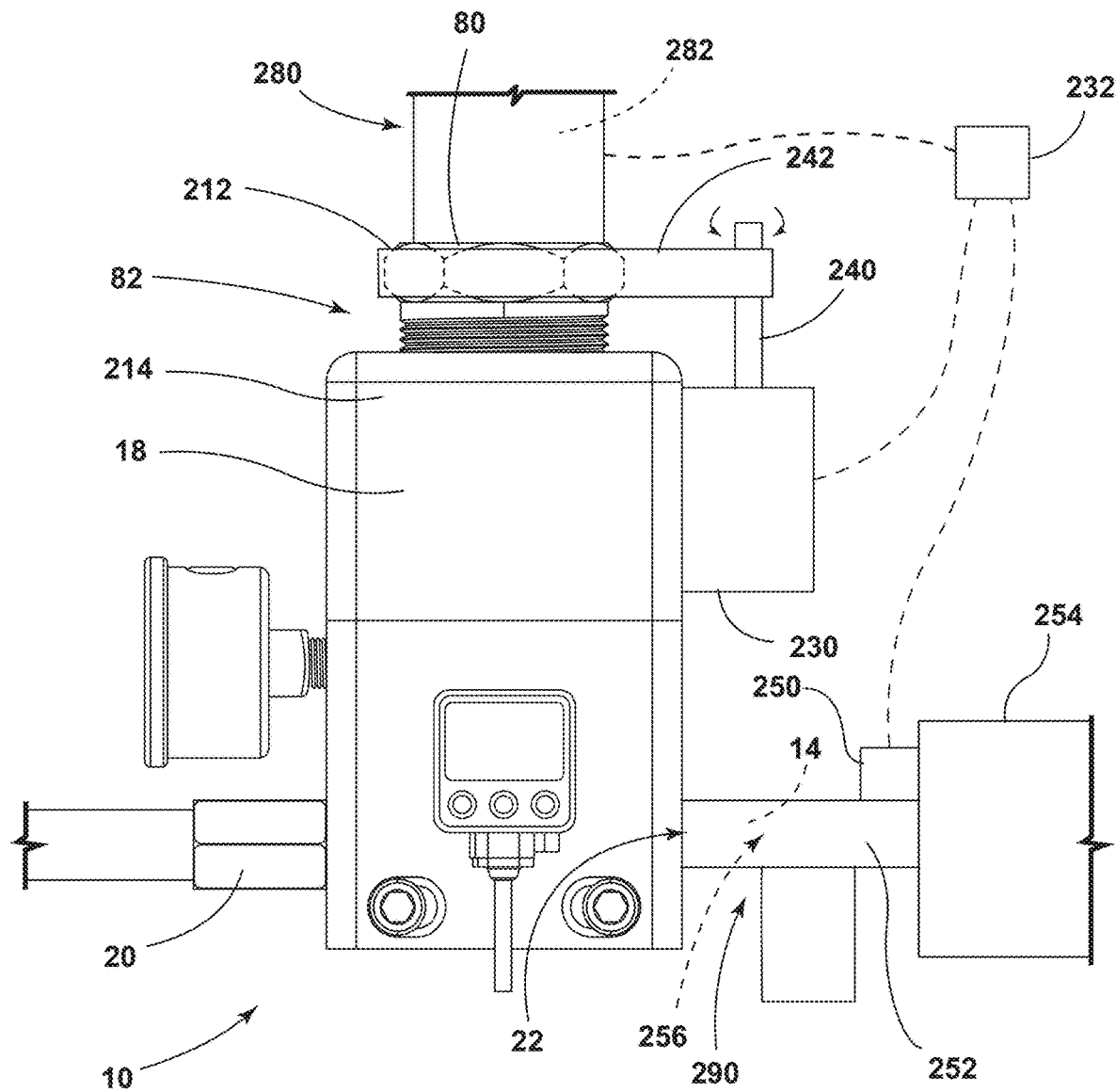
FIG. 11 is a front elevational view of a fluid regulator incorporating a programmable logic controller that operates a powered actuator for manipulating an adjustment knob of the manifold.
Figure 12:
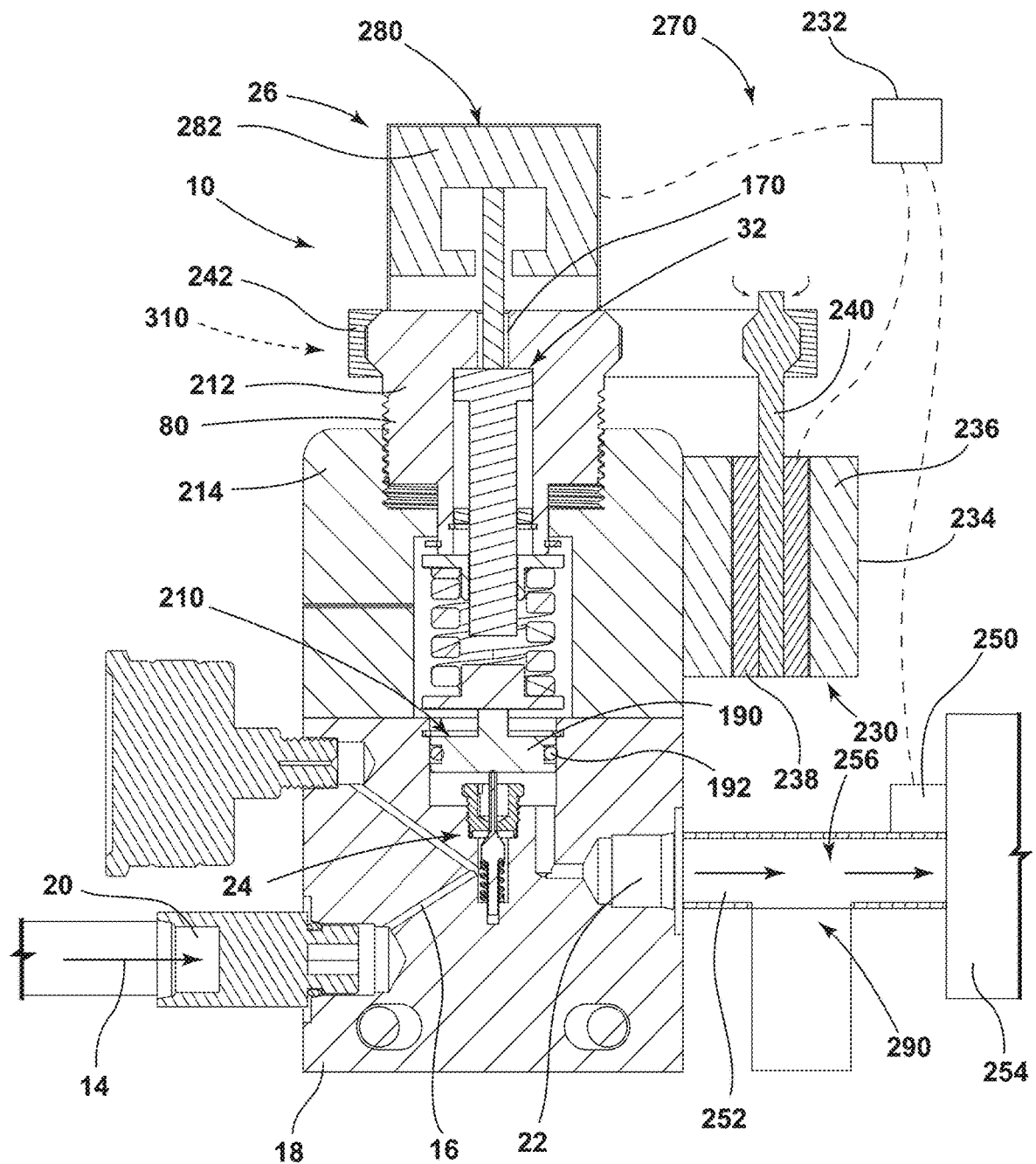
FIG. 12 is a cross-sectional view of the fluid flow regulator of FIG. 11 and shown during a typical operation of the fluid flow regulator.
Figure 13:
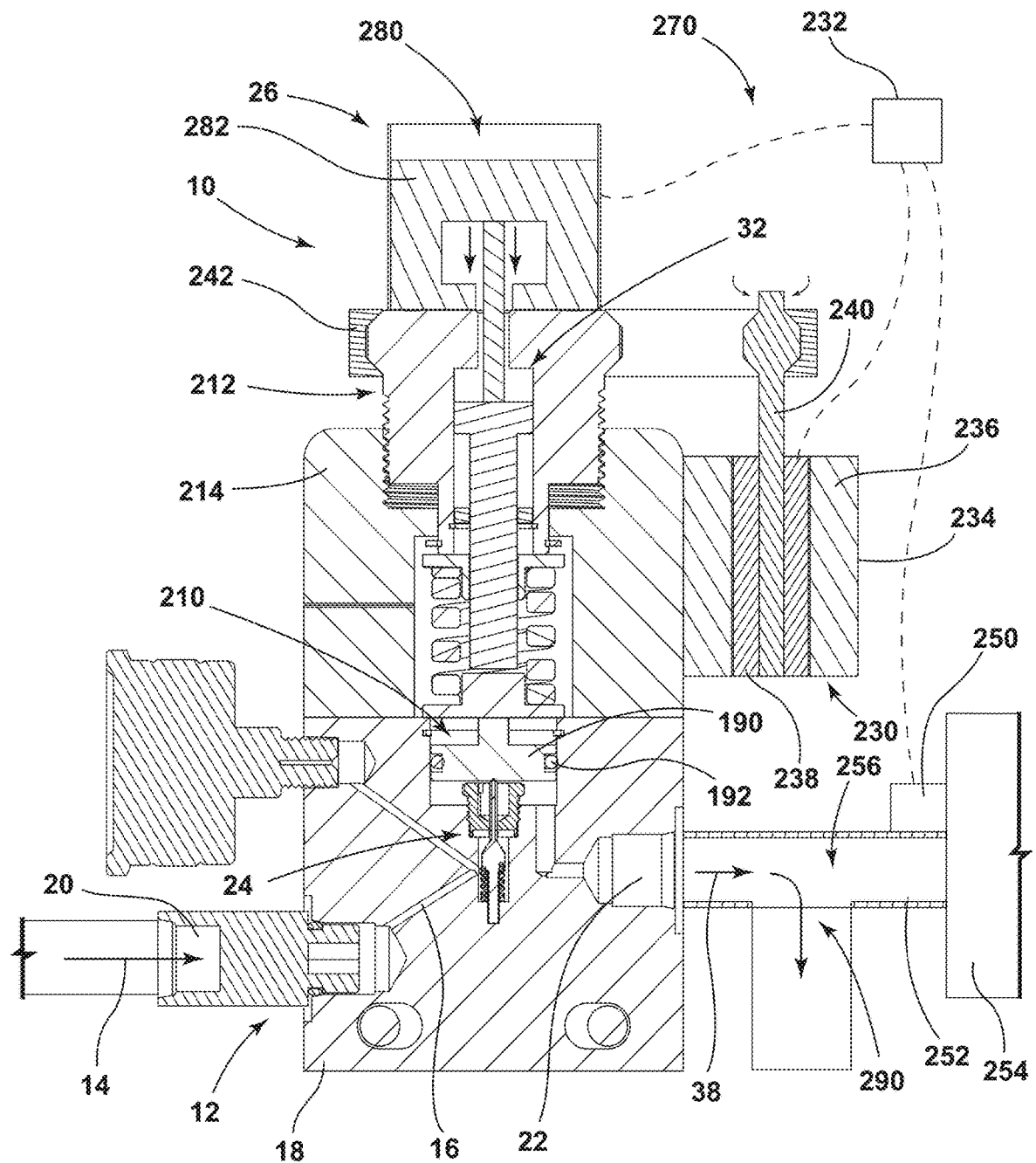
FIG. 13 is a cross-sectional view of the fluid flow regulator of FIG. 12 and showing operation of an outlet valve used during a quick purge function of the fluid flow regulator.
Figure 14:
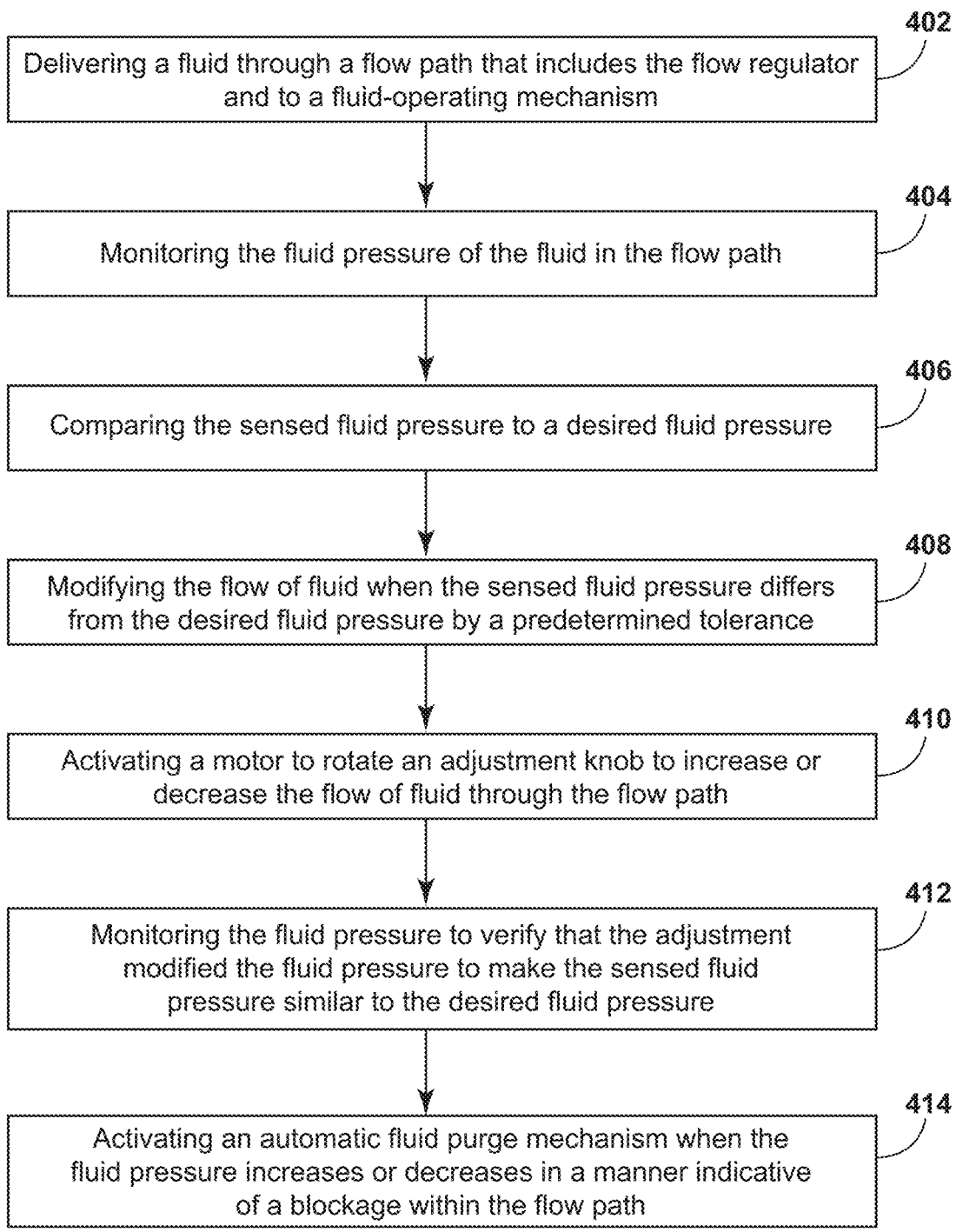
FIG. 14 is a linear flow diagram illustrating a method for operating a fluid flow regulator.

Referring now to FIGS. 5 and 6, as the fluid 14 moves through the inlet 20 and toward the poppet valve 24, the operable seal 74 that is positioned within an internal regulating path 90 is engaged by a transfer member 92 that transfers the predetermined spring tension 28 from the biasing spring 70 and toward the operable seal 74. An operating surface 94 of the operable seal 74 engages a poppet actuator 96 of the poppet valve 24. Typically, the operating surface 94 of the operable seal 74 is in continual engagement with the poppet actuator 96. As the threaded bolt 80 is adjusted, the spring tension 28 that is exerted by the biasing spring 70 and against the poppet actuator 96 is varied, as is the position and space 100 of the poppet surface 54 in relation to the poppet seat 52.

During operation of the fluid regulator 10, particulate matter, dirt, and other debris may become lodged within the space 100 between the poppet surface 54 and the poppet seat 52. This debris can result in a blockage that prevents the poppet valve 24 from defining the closed position 56 or smaller space 100. This blockage can, in turn, cause leakage within the fluid regulator 10 because the poppet valve 24 is unable to fully close and stop the flow of fluid 14. In conditions where a blockage may be present, operation of the fluid purge mechanism 32 can be utilized to dislodge the blockage. The fluid purge mechanism 32 allows for an increased flow of the fluid 14 to remove the blockage, thereby allowing the poppet valve 24 to close.

Referring now to FIGS. 4-10, the fluid purge mechanism 32 is positioned within the threaded bolt 80 and between the threaded bolt 80 and the biasing spring 70. Engagement of the fluid purge mechanism 32 operates the biasing spring 70 to define the purging open position 36 of the poppet valve 24. Through this configuration, the fluid purge mechanism 32 includes a pin 110 that is slidably operable within an interior bore 112 of the threaded bolt 80. When the pin 110 for the fluid purge mechanism 32 is operated, an engaging end 114 of the pin 110 presses against the transfer member 92, which, in turn, presses against the operable seal 74 and the poppet actuator 96. Manual operation of the pin 110 for the fluid purge mechanism 32 provides a bypass tension 150 that is a sufficient force to further overcome the poppet biasing force 58 of the poppet spring 50. Through this engagement of the pin 110 for the fluid purge mechanism 32, the poppet surface 54 is moved away from the poppet seat 52 regardless of the position of the threaded bolt 80 and regardless of the magnitude of the spring tension 28 exerted by the biasing spring 70 against the fluid purge mechanism 32.

Where the poppet valve 24 is in the closed position 56, operation of the fluid purge mechanism 32 can open the poppet valve 24. Also, where the threaded bolt 80 is operated to define a regulated flow 30 of the fluid 14, operation of the fluid purge mechanism 32 can increase the space 100 between the poppet surface 54 and the poppet seat 52 and increase the flow of the fluid 14 to define the purging flow 38 of the fluid 14. Accordingly, the fluid purge mechanism 32 can be engaged for defining the purging flow 38 of the fluid 14 in each of the plurality of axial positions 82 of the threaded bolt 80 for the regulating interface 26. This increased flow of fluid 14 that is indicative of the purging flow 38 is typically able to dislodge blockages in and around the poppet valve 24.

Referring again to FIGS. 5-10, the regulating interface 26 can include the transfer member 92 that is positioned at a seal end 120 of the biasing spring 70, where the transfer member 92 is configured to engage the operable seal 74. A bypass plate 122 is positioned at an interface end 124 of the biasing spring 70, wherein the fluid purge mechanism 32 is operably coupled with the bypass plate 122 to selectively engage the biasing spring 70. The bypass plate 122 is positioned between the threaded bolt 80 and the biasing spring 70. Through this configuration, when the pin 110 of the fluid purge mechanism 32 is engaged, the bypass plate 122 may be separated from the threaded bolt 80 to allow for efficient movement of the transfer member 92 towards the operable seal 74 and the poppet actuator 96.

In certain aspects of the device, the bypass plate 122 may be coupled with the threaded bolt 80 and operation of the pin 110 for the fluid purge mechanism 32 extends the biasing spring 70 in the direction of the poppet valve 24. In the various configurations, manipulation of the pin 110 for the fluid purge mechanism 32 supplements the spring tension 28 exerted by the biasing spring 70 to overcome, or further overcome, the poppet biasing force 58 and manipulate the poppet surface 54 away from the poppet seat 52. As discussed above, manual operation of the fluid purge mechanism 32 generates the purging flow 38 of the fluid 14 from the inlet 20 to the outlet 22 in a manner independent of the operation of the threaded bolt 80 of the regulating interface 26.

Referring again to FIGS. 1-10, the fluid regulator 10 includes the housing 18 that defines an internal flow path 16 and the internal regulating path 90 that intersects the internal flow path 16. The poppet valve 24 is disposed within the internal regulating path 90 and extends into the internal flow path 16. The poppet valve 24, in a standard state 130, defines the selectively regulated flow 30 of fluid 14 through the internal flow path 16. The poppet biasing force 58 biases the poppet valve 24 to a closed position 56 such that the poppet surface 54 is engaged with the poppet seat 52. The regulating interface 26 is positioned within the internal regulating path 90. The regulating interface 26 is selectively operable to overcome the poppet biasing force 58 to define the selectively regulated flow 30 of fluid 14. As discussed previously, manipulation of the regulating interface 26 changes the predetermined spring tension 28 that is exerted in opposition to the poppet biasing force 58. This manipulation of the regulating interface 26 adjusts the amount of separation and the size of the space 100 between the poppet surface 54 and the poppet seat 52 to modify the magnitude of the selectively regulated flow 30 of fluid 14. The fluid purge mechanism 32 is positioned within the regulating interface 26 and extends, typically, along a central rotational axis 146 of the regulating interface 26. The fluid purge mechanism 32 further manipulates the poppet valve 24 to define the purging open position 36 that defines the purging flow 38 of the fluid 14 through the internal flow path 16 from the inlet 20 to the outlet 22.

As discussed previously, the operable seal 74 separates the internal regulating path 90 into the poppet portion 140 and the regulating portion 142. The poppet portion 140 intersects the internal flow path 16. The poppet valve 24 is positioned within the poppet portion 140 and the regulating interface 26 and the fluid purge mechanism 32 are each positioned within the regulating portion 142 of the internal regulating path 90. The regulating interface 26 includes a biasing spring 70 that engages the operable seal 74. Operation of a regulating member, typically in the form of the threaded bolt 80, defines the predetermined spring tension 28 of the biasing spring 70 that acts in opposition to the poppet biasing force 58 of the poppet spring 50. The amount of the predetermined spring tension 28 that is exerted upon the operable seal 74 is determined by the predetermined spring tension 28 of the biasing spring 70. Additionally, the position of the operable seal 74 is determined by the predetermined spring tension 28 of the biasing spring 70 to define the magnitude, fluid pressure and rate of the regulated flow 30 of the fluid 14.

Referring again to FIGS. 5-10, in certain aspects of the device, the fluid purge mechanism 32 includes a slidably operable pin 110 that operates within a threaded bolt 80 to engage the bypass plate 122. It is contemplated that the bypass plate 122 can separate from the threaded bolt 80 to adjust the predetermined spring tension 28 to define the bypass tension 150. This bypass tension 150 is exerted against the transfer member 92 such that the operating surface 94 of the operable seal 74 engages the poppet actuator 96 to overcome the poppet biasing force 58 and separate, or further separate, the poppet surface 54 from the poppet seat 52. Through this configuration, manipulation of the pin 110 for the fluid purge mechanism 32 defines the purging open position 36 of the poppet valve 24 that allows for the increased flow of fluid 14 that is indicative of the purging flow 38 of fluid between the inlet 20 to the outlet 22.

Referring again to FIGS. 1-10, the fluid regulator 10 includes the housing 18 that defines the internal flow path 16 and the internal regulating path 90 that intersect at the internal flow path 16. The operable seal 74 defines a boundary 34 of the internal flow path 16 and separates a portion of the internal regulating path 90 from the internal flow path 16. The poppet valve 24 is disposed within the internal regulating path 90 and also within the internal flow path 16. Where the poppet valve 24 is in a standard state 130, as opposed to the purge state 160, the poppet valve 24 is configured to define the selectively regulated flow 30 of fluid 14 through the internal flow path 16. The threaded regulating interface 26 is positioned within the internal regulating path 90 and outside of the internal flow path 16. The regulating interface 26 adjusts the spring tension 28 that is exerted against the operable seal 74 and in opposition to the poppet biasing force 58. As discussed previously, this opposition between the spring tension 28 and the poppet biasing force 58 determines at least one of the fluid pressure and the rate of the regulated flow 30 of fluid 14 from the inlet 20 to the outlet 22. The fluid purge mechanism 32 is slidably disposed within the regulating interface 26, wherein the fluid purge mechanism 32 manipulates the spring tension 28 independently of the threaded regulating interface 26. This independent operation of the fluid purge mechanism 32 defines the purging open position 36 and the purging flow 38 of fluid 14 through the internal flow path 16. As discussed above, operation of the fluid purge mechanism 32 serves to overcome, independently of the position of the threaded regulating interface 26, the poppet biasing force 58 to separate, or further separate, the poppet surface 54 from the poppet seat 52.

Referring again to FIGS. 5-10, the pin 110 for the fluid purge mechanism 32 is included within an interior bore 112 of the regulating interface 26. The threaded bolt 80 includes a purge aperture 170 that allows for a tool to be inserted therethrough for engaging the pin 110. A purge interface, such as a purge activating surface 172 of the pin 110 is typically positioned below an upper surface 174 of the threaded bolt 80. This configuration prevents inadvertent activation of the fluid purge mechanism 32. When the fluid purge mechanism 32 is desired to be activated, a tool can be inserted through the purge aperture 170 and the pin 110 can be slidably biased toward the poppet valve 24. As discussed previously, the fluid purge mechanism 32 can be activated in any of the plurality of axial positions 82 of the threaded bolt 80 for the regulating interface 26. As the pin 110 is moved, typically in an axial direction, toward the poppet valve 24, the pin 110 engages the transfer member 92 and, in turn, the operable seal 74. This engagement causes the operating surface 94 of the operable seal 74 to bias the poppet actuator 96 toward the poppet seat 52 and, in turn, separate or further separate the poppet surface 54 from the poppet seat 52.

The internal regulating path 90 includes a stopping surface 180 that prevents the transfer member 92 from moving too close to the poppet valve 24. This stopping surface 180 defines a maximum operating position 182 of the transfer member 92 and defines a position at which the transfer member 92 can engage the operable seal 74 for pressing the poppet actuator 96 toward the poppet spring 50 for providing a maximum size of space 100 between the poppet surface 54 and the poppet seat 52. This configuration results in a maximum purging flow 38 of the fluid 14. This stopping surface 180 also prevents overreaching movement of the pin 110 and the transfer member 92 that might cause the operable seal 74 to engage a poppet chamber 184 that surrounds the poppet actuator 96. The stopping surface 180 may also include an area below the poppet valve 24 that defines a maximum operating position 182 of the space 100 between the poppet surface 54 and the poppet seat 52. Accordingly, a completely engaged position of the transfer member 92 positions the operating surface 94 of the operable seal 74 in a slightly offset configuration from the poppet chamber 184. Through this configuration, engagement of the operating surface 94 with the poppet chamber 184 is prevented to allow for the continuous purging flow 38 of fluid 14 from the inlet 20 and through the outlet 22.

As exemplified in FIGS. 5-10, the fluid purge mechanism 32 is included within the internal regulating path 90 that accommodates the regulating interface 26. By including the fluid purge mechanism 32 within the regulating interface 26, an additional aperture or opening within the housing 18 is not needed. Accordingly, manufacture of the housing 18 can be accomplished without adding additional apertures within the housing 18 that may result in sources of leaks or other failures within the fluid regulator 10.

During manufacture of the fluid regulator 10, the regulating interface 26 can be manufactured with the fluid purge mechanism 32 incorporated therein. Accordingly, the regulating interface 26 and the fluid purge mechanism 32 can be installed within the housing 18 for the fluid regulator 10 as a single piece. Additionally, manipulation of the threaded bolt 80 for the regulator interface may also result in the manipulation of the pin 110 for the fluid purge mechanism 32. The interior bore 112 of the regulating interface 26 that houses the pin 110 that at least partially defines the fluid purge mechanism 32 can extend through the threaded bolt 80 and also through the bypass plate 122. Accordingly, the bypass plate 122 serves to align the engaging end 114 of pin 110 with the transfer member 92 for engaging the fluid purge mechanism 32.

According to various aspects of the device, the fluid regulator 10 disclosed herein can be incorporated within any one of various fluid assemblies. Additionally, the fluid regulator 10 can be used for various fluids 14 that can be moved through the fluid regulator 10. Such fluids 14 can include fluids 14 having various viscosities, adhesiveness, and other material characteristics that can be seen within various fluids 14 that are moved through delivery assemblies.

As exemplified in FIGS. 5-10, the operable seal 74 can include an operable disk 190 that includes a perimeter seal 192 that extends around the operable seal 74 and engages the interior bore 112 of the internal regulating path 90. This perimeter seal 192 prevents the flow of fluid 14 around the operable seal 74 and into the regulating portion 142 of the internal regulating path 90. Additionally, the internal regulating path 90 can include a seal retainer 198 that is disposed within the interior bore 112 of the internal regulating path 90. This device prevents the movement of the operable seal 74 away from the poppet valve 24 and can also contain the operable seal 74 in position during manufacture and assembly of the fluid regulator 10.

Referring now to FIGS. 6, 8 and 10-13, the fluid regulator 10 includes an internal fluid purge mechanism 32 that is incorporated within the regulating interface 26 for the flow regulator 10. The flow regulator 10 includes the inlet 20 that delivers the fluid 14 into the flow path 16 of the flow regulator 10. As discussed herein, this fluid 14 can be in the form of adhesives, lubricants, air, combinations thereof, and other similar flowable materials. To control the flow of the fluid through the flow regulator 10, a poppet valve 24 is set within a poppet seat 52. The poppet valve 24 is operable via a sealed piston 210 that operates between open and closed positions 36, 56. The sealed piston 210 is formed by the operable seal 74 that is made up of the operable disk 190 and the perimeter seal 192. The regulating interface 26 includes an adjustment knob 212, such as the threaded bolt 80 that is rotated within the manifold 214 of the fluid regulator 10. Movement of the adjustment knob 212 adjusts the tension that is applied to the sealed piston 210. This adjustment of tension controls the poppet valve 24 during operation of the flow regulator 10.

Referring again to FIGS. 11-13, an aspect of the flow regulator 10 incorporates a closed-loop operation of the components of the flow regulator 10, the adjustment knob 212 is controlled using a powered actuator 230 that is secured proximate the manifold 214 and is operated utilizing a programmable logic controller (PLC) 232. The powered actuator 230 can be in the form of various actuators that can include, but are not limited to, a motor, a servo, a rotary actuator, a linear actuator, combinations thereof, or other similar actuator. The powered actuator 230 that operates the adjustment knob 212 can be in the form of various actuators that can include, but are not limited to, a motor, a servo, a rotary actuator, a linear actuator, combinations thereof, or other similar actuator. In certain aspects of the device, the powered actuator 230 can include a stator 234 that receives an electrical current to energize windings 236 of the stator 234. When the windings 236 are energized, the stator 234 is placed in electromagnetic communication with a rotor 238 having a drive shaft 240. Operation of the rotor 238, in turn, rotates the drive shaft 240 and a drive element 242 that extends between the drive shaft 240 and the adjustment knob 212. This drive element 242 can be in the form of a direct linkage, a belt-drive, a chain drive, gear train, or other similar rotationally operable interface that extends between the powered actuator 230 and the adjustment knob 212.

Referring again to FIGS. 6, 8 and 10-13, a pressure sensor 250 is attached to a fluid conduit 252. This fluid conduit 252 extends between the outlet 22 of the flow regulator 10 and a fluid-operating mechanism 254 to which the fluid 14 is delivered. The pressure sensor 250 monitors a fluid pressure 256 of the fluid 14 leaving the flow regulator 10 and moving within the fluid conduit 252. Accordingly, the pressure sensor 250 monitors the fluid pressure 256 of the fluid 14 being delivered through the fluid conduit 252 and to the fluid-operating mechanism 254. According to various aspects of the device, the fluid-operating mechanism 254 being served by the fluid regulator 10 can be any one of various fluid-operating devices such as a dispenser, a lubricating assembly, an adhesive dispensing assembly and other similar fluid-delivery devices.

During operation of the flow regulator 10, the pressure sensor 250 monitors the fluid pressure 256 within the fluid conduit 252 and communicates this fluid pressure 256 with the PLC 232. Where the sensed fluid pressure 256 within the fluid conduit 252 is above or below a desired fluid pressure 256, the PLC 232 communicates with the powered actuator 230 for adjusting the adjustment knob 212 to increase or decrease the flow of fluid 14 through the flow regulator 10 and through the fluid conduit 252. Where the fluid pressure 256 is within a desired range, the PLC 232 can remain idle or can record within a memory that the fluid pressure 256 of the fluid 14 moving through the fluid conduit 252 at a recorded time was within an appropriate tolerance. It is contemplated that the desired fluid pressure 256 can be a specifically identified fluid pressure 256. It is also contemplated that the desired fluid pressure 256 can be a range of fluid pressures 256.

As exemplified in FIGS. 6, 8 and 10-13, the pressure sensor 250, the PLC 232 and the powered actuator 230 cooperate to provide a closed-loop interface of the fluid regulating system 270 that can increase or decrease fluid pressure 256 in real time and without outside intervention. During operation of the flow regulator 10, the pressure sensor 250 periodically or continuously monitors the fluid pressure 256 at least within the fluid conduit 252. The PLC 232 communicates with the pressure sensor 250 and the powered actuator 230 to initiate and carry out any adjustments that are required to maintain the fluid pressure 256 within the fluid conduit 252 at a desired level or range of fluid pressures.

As exemplified in FIGS. 6, 8 and 10-13, the powered actuator 230 is typically a bi-directional motor that can operate in clockwise and counterclockwise directions for manipulating the adjustment knob 212 to increase or decrease the flow of the fluid 14 through the flow regulator 10. It is also contemplated that a powered actuator 230 can be a one-direction motor. In such an aspect of the device, a transmission or other adjustment mechanism can be positioned within the drive element 242 or other location between the drive shaft 240 and the adjustment knob 212 for converting rotation of the rotor 238, in a single direction, into a bi-directional capability that can operate the adjustment knob 212 in both clockwise and counterclockwise directions.

Referring again to FIGS. 6, 8 and 10-13, an automatic fluid purge mechanism 280 can include a purge actuator 282 that is placed in communication with the PLC 232 and the pressure sensor 250 for operating the pin 110 within the interface aperture of the adjustment knob 212. Where the pressure sensor 250 detects a significant increase or decrease of the fluid pressure 256 of the fluid conduit 252, or within the flow regulator 10, the pressure sensor 250 can communicate such increase or decrease to the PLC 232. In situations where the increase or decrease in fluid pressure 256 is outside of a predetermined threshold, the PLC 232, through the automatic fluid purge mechanism 280, can activate the purge actuator 282 of the fluid purge mechanism 32 to operate the pin 110 within the purge aperture 170. As discussed herein, when the pin 110 is engaged, the quick purge function of the flow regulator 10 is activated and a consistent volume of the fluid 14 moves quickly through the flow path 16 and the poppet valve 24 of the flow regulator 10. When the automatic fluid purge mechanism 280 is activated, a separate outlet valve 290 that is attached to one of the flow regulator 10 and the fluid conduit 252 can also be activated. The outlet valve 290 is operated to direct the increased volume of the purged fluid 14 away from the fluid-operating mechanism 254 and to prevent damage to the fluid-operating mechanism 254 being served by the flow regulator 10. Use of the outlet valve 290 can be used for flushing a blockage, particulate, or other foreign matter that may be contained within the fluid 14 moving through the flow regulator 10 and the fluid conduit 252.

According to various aspects of the device, where the pressure sensor 250 senses a significant increase or decrease in fluid pressure 256 within the flow regulator 10 or the fluid conduit 252, such increase or decrease can be indicative of a blockage or other impediment present within the flow path 16 of the flow regulator 10 or within the fluid conduit 252. During operation of the flow regulator 10, a blockage may result in a rapid increase or decrease in the fluid pressure 256, as sensed by the pressure sensor 250. In such a situation, the automatic fluid purge mechanism 280 can be quickly engaged for activating the fluid purge mechanism 32.

In certain aspects of the device, a blockage may result in a minimal increase or decrease in the fluid pressure 256 within the flow regulator 10 or the fluid conduit 252. As described herein, increases in the fluid pressure 256 typically result in the PLC 232 activating the powered actuator 230 to rotate the adjustment knob 212 to increase or decrease the flow of the fluid 14 through the flow regulator 10. Where a blockage is present, operation of the adjustment knob 212 may not result in the desired regulation or modification of the fluid pressure 256 of the fluid 14. Accordingly, where the pressure sensor 250 communicates an increase or decrease in the fluid pressure 256 to the PLC 232, a response by the PLC 232 can be monitored and evaluated by the pressure regulator to ensure that the appropriate change in fluid pressure 256 has been achieved. In conditions where a blockage is present within the flow regulator 10 or the fluid conduit 252, operation of the powered actuator 230 to rotate the adjustment knob 212, which should increase or decrease the fluid pressure 256, may have little to no effect.

Accordingly, inconsistency between a communicated operation of the powered actuator 230 and a change in the fluid pressure 256 as a result of movement of the adjustment knob 212 may be indicative of a blockage within the flow path 16. Accordingly, inconsistency between operation of a powered actuator 230 and a change in the fluid pressure 256 can also result in the PLC 232 activating the automatic fluid purge mechanism 280 and the outlet valve 290.

Referring again to FIGS. 6, 8 and 10-13, in certain aspects of the device, other actions by the PLC 232 may be initiated before the automatic fluid purge mechanism 280 is activated. Increasing the flow of the fluid 14 using the powered actuator 230 and the adjustment knob 212 may be sufficient to restore the desired or expected flow of the fluid 14 through the fluid conduit 252 such that use of the quick purge function may not be required. In this manner, a relief setting 310 of the flow regulator 10 can be achieved by operating the powered actuator 230 to rotate the adjustment knob 212 to a fully open position. In this condition, the powered actuator 230 operates the adjustment knob 212 and, in turn, the poppet valve 24 to the relief setting 310 to provide a flush of the interior components of the flow regulator 10. In this relief setting 310, at least one of the poppet spring 50 and the biasing spring 70 allow the poppet valve 24 to be biased toward the closed position 56. This biasing operation provide by the poppet spring 50 and the biasing spring 70 provide some regulation of the fluid pressure 256 moving through the flow regulator 10 and the fluid conduit 252. Conversely, in a quick purge function that is activated by the automatic fluid purge mechanism 280, the poppet valve 24 is held open by the pin 110 so that a maximum amount of fluid 14 moves through the flow regulator 10 and the outlet valve 290 attached to the fluid conduit 252.

Where the powered actuator 230 operates the adjustment knob 212 to the relief setting 310, the outlet valve 290 may remain closed such that the fluid 14 moving through the flow path 16 and the fluid conduit 252 is directed to the fluid-operating mechanism 254 being served by the flow regulator 10. Where the automatic fluid purge mechanism 280 is actuated, the outlet valve 290 is typically opened to receive the foreign matter that is flushed using the purge function.

Referring now to FIGS. 6, 8 and 10-14, having described various aspects of the device, a method 400 is disclosed for operating a flow regulator 10 for delivering a fluid 14 through a flow path 16. According to the method 400, a fluid 14 is delivered through the flow regulator 10 and to a fluid-operating mechanism 254 (step 402). During operation of the flow regulator 10, a pressure sensor 250 monitors the fluid pressure 256 within the flow regulator 10 and the fluid conduit 252 (step 404). This sensed fluid pressure 256 is continually delivered to the PLC 232, at least periodically. The PLC 232 compares the sensed fluid pressure 256 with the desired fluid pressure 256 (Step 406). Where the PLC 232 recognizes that difference exists between the sensed fluid pressure 256 and the desired fluid pressure 256, and this difference is outside of a predetermined tolerance, the PLC 232 communicates an activation signal to the powered actuator 230 (step 408). This activation signal can include a rotational direction and a rotational distance that the powered actuator 230 is to operate. The powered actuator 230 rotates the adjustment knob 212 to increase or decrease the flow of fluid 14 through the flow regulator 10 (step 410). After adjustment of the adjustment knob 212, the pressure sensor 250 monitors the fluid pressure 256 to insure that the adjustment obtained the desired result with respect to the fluid pressure 256 within the flow path 16 (step 412).

Referring again to FIGS. 6, 8 and 10-14, additional steps of method 400 can include a step 414 of activating the automatic fluid purge mechanism 280 when the PLC 232, using the sensed fluid pressure 256 of the pressure sensor 250, determines that a significant increase or decrease in fluid pressure 256 within the flow path 16 has taken place. This activation of the automatic fluid purge mechanism 280 can be for a predetermined period of time that is used to dislodge or otherwise remove any impediment or blockage within the flow path 16. Alternatively, the purge function can occur until such time as the pressure sensor 250 senses that the fluid pressure 256 has regularized and the purge has dislodged the impediment to the flow of the fluid 14.

After performance of an automatic purge function, the flow regulator 10 returns to a typical operation and the pressure sensor 250 operates to ensure that the fluid pressure 256 within the flow path 16 is within a desired tolerance or range for operation of the flow regulator 10. Accordingly, the pressure sensor 250 acts as a mechanism for monitoring the fluid pressure 256 to determine whether adjustment is needed. The pressure sensor 250 also acts as a verification device to ensure that whatever adjustment has been made achieves the desired result.

According to the various aspects of the device, the PLC 232 is used for operating a powered actuator 230 and an automatic fluid purge mechanism 280 for defining a closed-loop operation of the flow regulator 10 that can be operated without intervention or substantially without intervention. It is contemplated that certain maintenance and repairs may be needed with respect to the components of the flow regulator 10 and the components attached thereto.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A fluid regulator comprising:
   a poppet valve that is disposed within a flow path and that selectively allows a flow of fluid from an inlet to an outlet;
   a threaded regulating interface that adjusts a spring tension that is exerted toward the poppet valve and defines a regulated flow of the fluid through the flow path, wherein the threaded regulating interface is operated by a powered actuator about a rotational axis;
   a fluid purge mechanism positioned within the threaded regulating interface, wherein the fluid purge mechanism operates along the rotational axis and adjusts a boundary of the flow path and manipulates the poppet valve to a maximum operating position to define a purging flow of the fluid from the inlet to the outlet;
   a pressure sensor in communication with the flow path; and
   a programmable logic controller that cooperates with the powered actuator and the pressure sensor to define a closed-loop interface that adjusts the regulated flow of the fluid through the flow path, wherein the fluid purge mechanism includes a purge actuator that is in communication with the pressure sensor and the programmable logic controller, wherein the programmable logic controller activates the purge actuator in response to the pressure sensor sensing a fluid pressure that is outside of a predetermined threshold.

2. The fluid regulator of claim 1, wherein the threaded regulating interface defines the boundary of the flow path, and wherein the fluid purge mechanism adjusts the boundary as defined by the threaded regulating interface.

3. The fluid regulator of claim 1, wherein the powered actuator is a motor.

4. The fluid regulator of claim 1, wherein the threaded regulating interface comprises:
a biasing spring that defines a predetermined spring tension that biases an operable seal toward the poppet valve, wherein a poppet biasing force opposes the predetermined spring tension; and
a threaded bolt that is rotationally operable relative to the flow path to define a plurality of axial positions, wherein the plurality of axial positions corresponds to a respective plurality of spring tensions, wherein the plurality of spring tensions includes the predetermined spring tension.

5. The fluid regulator of claim 4, wherein the fluid purge mechanism is positioned between the threaded bolt and the biasing spring, wherein engagement of the fluid purge mechanism operates the biasing spring to define the maximum operating position of the poppet valve.

6. The fluid regulator of claim 5, wherein the fluid purge mechanism is a pin that is slidably operable within the threaded bolt.

7. The fluid regulator of claim 4, further comprising:
a transfer member positioned at a seal end of the biasing spring and that engages the operable seal; and
a bypass plate positioned at an interface end of the biasing spring, wherein the fluid purge mechanism is operably coupled with the bypass plate to selectively engage the biasing spring, wherein the bypass plate is positioned between the threaded bolt and the biasing spring.

8. A fluid regulator comprising:
a housing that defines an internal flow path and an internal regulating path that intersects the internal flow path;
a poppet valve that is disposed within the internal regulating path and the internal flow path, wherein the poppet valve in a standard state defines a selectively regulated flow of fluid through the internal flow path, wherein a poppet biasing force biases the poppet valve to a closed position;
a regulating interface positioned within the internal regulating path, wherein the regulating interface includes a powered actuator that operates the regulating interface to overcome the poppet biasing force to define the selectively regulated flow of the fluid;
an automatic fluid purge mechanism positioned within the regulating interface, wherein the automatic fluid purge mechanism manipulates the poppet valve to define a maximum operating position that defines a purging flow of the fluid through the internal flow path;
a pressure sensor in communication with the flow path;
a programmable logic controller that cooperates with the powered actuator, the pressure sensor and the automatic fluid purge mechanism to define a closed-loop interface that adjusts the selectively regulated flow of the fluid through the flow path; and
an operable seal that separates the internal regulating path into a poppet portion and a regulating portion, wherein the poppet portion intersects the internal flow path, wherein
the regulating interface includes a biasing spring that engages the operable seal;
operation of a regulating member of the regulating interface defines a predetermined spring tension of the biasing spring;
the regulating interface is a threaded bolt that rotates about a central rotational axis;
the fluid purge mechanism is positioned along the central rotational axis and within the threaded bolt;
the fluid purge mechanism is a pin that slidably operates within the threaded bolt to engage a bypass plate;
the bypass plate adjusts the predetermined spring tension to a bypass tension that places the poppet valve in the maximum operating position; and
wherein a purge actuator activates to axially operate the pin.

9. The fluid regulator of claim 8, wherein the powered actuator is a rotary actuator having a motor.

10. The fluid regulator of claim 8, wherein the poppet valve being positioned within the poppet portion and the regulating interface and the fluid purge mechanism being positioned within the regulating portion.

11. The fluid regulator of claim 8, wherein the operation of the fluid purge mechanism is independent of the operation of the powered actuator.

12. The fluid regulator of claim 11, wherein the fluid purge mechanism is accessible through an aperture defined within the regulating interface.

13. The fluid regulator of claim 8, wherein the biasing spring is positioned between the bypass plate and a transfer member that engages the operable seal.

14. A fluid regulator comprising:
a poppet valve that is disposed within a flow path and that selectively allows a flow of fluid from an inlet to an outlet;
a threaded regulating interface that adjusts a spring tension that is exerted toward the poppet valve and defines a regulated flow of the fluid through the flow path, wherein the threaded regulating interface is operated by a powered actuator about a rotational axis, wherein the threaded regulating interface further comprises:
a biasing spring that defines a predetermined spring tension that biases an operable seal toward the poppet valve, wherein a poppet biasing force opposes the predetermined spring tension; and
a threaded bolt that is rotationally operable relative to the flow path to define a plurality of axial positions, wherein the plurality of axial positions corresponds to a respective plurality of spring tensions, wherein the plurality of spring tensions includes the predetermined spring tension;
a fluid purge mechanism positioned within the threaded regulating interface, wherein the fluid purge mechanism operates along the rotational axis and adjusts a boundary of the flow path and manipulates the poppet valve to a maximum operating position to define a purging flow of the fluid from the inlet to the outlet;
a pressure sensor in communication with the flow path;
a programmable logic controller that cooperates with the powered actuator and the pressure sensor to define a closed-loop interface that adjusts the regulated flow of the fluid through the flow path;
a transfer member positioned at a seal end of the biasing spring and that engages the operable seal; and
a bypass plate positioned at an interface end of the biasing spring, wherein the fluid purge mechanism is operably coupled with the bypass plate to selectively engage the biasing spring, wherein the bypass plate is positioned between the threaded bolt and the biasing spring.

15. The fluid regulator of claim 14, wherein the threaded regulating interface defines the boundary of the flow path, and wherein the fluid purge mechanism adjusts the boundary as defined by the threaded regulating interface.

16. The fluid regulator of claim 14, wherein the powered actuator is a motor.

17. The fluid regulator of claim 14, wherein the fluid purge mechanism is positioned between the threaded bolt and the biasing spring, wherein engagement of the fluid purge mechanism operates the biasing spring to define the maximum operating position of the poppet valve.

18. The fluid regulator of claim 17, wherein the fluid purge mechanism is a pin that is slidably operable within the threaded bolt.

19. The fluid regulator of claim 14, wherein the fluid purge mechanism includes a purge actuator that is in communication with the pressure sensor and the programmable logic controller, wherein the programmable logic controller activates the purge actuator in response to the pressure sensor sensing a fluid pressure that is outside of a predetermined threshold.

20. The fluid regulator of claim 19, wherein the fluid pressure being outside of the predetermined threshold is indicative of a blockage being present within the flow path.

* * * * *